(12) United States Patent
Liberman et al.

(10) Patent No.: US 8,562,776 B2
(45) Date of Patent: Oct. 22, 2013

(54) FAST ELECTROSTATIC SHUTTER AND METHOD OF ACHIEVING OFFSET COMPENSATION IN INFRARED VIDEO IMAGERS USING FAST SHUTTERS

(75) Inventors: Sergey Liberman, Waltham, MA (US); Michael Joswick, Bedford, NH (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 0 days.

(21) Appl. No.: 13/611,436

(22) Filed: Sep. 12, 2012

(65) Prior Publication Data

US 2013/0000828 A1    Jan. 3, 2013

Related U.S. Application Data

(62) Division of application No. 12/328,939, filed on Dec. 5, 2008, now Pat. No. 8,330,820.

(51) Int. Cl.
*B32B 37/12* (2006.01)

(52) U.S. Cl.
USPC ........................................................ 156/221

(58) Field of Classification Search
USPC ................. 156/272.2, 267, 268, 221
See application file for complete search history.

(56) References Cited

U.S. PATENT DOCUMENTS

| | | | |
|---|---|---|---|
| 3,772,537 A | 11/1973 | Clifford et al. | |
| 3,989,357 A | 11/1976 | Kalt | |
| 5,196,703 A | 3/1993 | Keenan | |
| 5,681,103 A | 10/1997 | Remillard et al. | |
| 6,057,814 A | 5/2000 | Kalt | |
| 6,443,637 B1 | 9/2002 | Dowe | |
| 7,417,682 B2 | 8/2008 | Kuwakino et al. | |
| 7,470,902 B1 | 12/2008 | Kraemer et al. | |
| 7,602,438 B2 | 10/2009 | McGarvey et al. | |
| 7,705,826 B2 | 4/2010 | Kalt et al. | |
| 2002/0036059 A1* | 3/2002 | Kalt et al. | 156/267 |
| 2005/0012843 A1* | 1/2005 | Kuwakino et al. | 348/335 |
| 2008/0302956 A1 | 12/2008 | Anderson | |

FOREIGN PATENT DOCUMENTS

| | | |
|---|---|---|
| JP | 09325073 | 12/1997 |
| JP | 2000088644 | 3/2000 |
| JP | 2005331829 | 12/2005 |
| JP | 2005331830 | 12/2005 |
| JP | 2005331830 A * | 12/2005 |
| JP | 2005333335 | 12/2005 |
| JP | 2006030886 | 2/2006 |
| JP | 2008219613 | 9/2008 |

OTHER PUBLICATIONS

Goodwin-Johansson, Scott et al., "High Speed, Large Motion Electrostatic Artificial Eyelid", IEEE, 2002, pp. 610-613.

* cited by examiner

*Primary Examiner* — Daniel McNally
(74) *Attorney, Agent, or Firm* — Daniel J. Long; Maine Cernota & Rardin; David A. Rardin (57) ABSTRACT

Embodiments of the invention are directed to methods and apparatus for infrared imagers including fast electrostatic shutters and offset compensation. Fast electrostatic shutters are used for video image correction including image offset compensation where temporal noise and scene nonuniformity are corrected. This method provides a shutterless experience for the user because the image will be blocked for only one frame at a time. A method of manufacturing an electrostatic infrared shutter includes a conductive infrared-transparent substrate, covering it with an insulating layer, depositing adhesive and a thin film stack, delineating a working area, providing contacts, heat-treating the assembly, and making the polymer non-reflective in the infrared.

20 Claims, 7 Drawing Sheets

FAST ELECTROSTATIC SHUTTER AND METHOD OF ACHIEVING OFFSET COMPENSATION IN INFRARED VIDEO IMAGERS USING FAST SHUTTERS

CROSS REFERENCE TO RELATED APPLICATIONS

This application is a divisional of U.S. Ser. No. 12/328,939, filed Dec. 5, 2008; the contents all of which are incorporated herein by reference.

FIELD OF THE INVENTION

The invention relates to infrared imagers, and more particularly, to high speed shutters and offset compensation.

BACKGROUND OF THE INVENTION

Shutters are used in infrared imagers for periodic correction of spatial noise in video images caused by temporal changes in image acquisition module parameters on the pixel scale. The shutters are engaged periodically (e.g. once per minute). Infrared imagers commonly employ mechanical flag or iris shutters. Operation of such shutters is slow. It may take several video frames for shutters to engage and disengage. Typically, they block the scene for the duration of the order of hundreds of milliseconds, which causes noticeable breaks in the video stream. Also, they are noisy, consume considerable power, and their assemblies are relatively large and heavy.

In thermal imagers, a fast shutter that blocks the video for only one or two frames would create "shutterless" experience for the user, i.e. the video stream will not be noticeably interrupted. However, the time required for imager pixels to reach thermal equilibrium imposes a limit on how fast the shutter operation can be performed. It may not allow use of the full speed of the shutter. The thermal time constants of uncooled imager pixels may be comparable to or longer than the duration of one or two frames, therefore this interval will be insufficient for the imager to thermalize to the thermally uniform scene presented by the shutter. This would result in residual spatial noise left in the image stream after engagement of the fast shutter.

What is needed, therefore, are imagers with improved performance to meet increasing system requirements.

SUMMARY OF THE INVENTION

The disclosed shutter and method can be used in both military and commercial infrared imagers to provide a fast thin, light, quiet shutter, with little power consumption and reduced spatial noise. The offset compensation method gives a procedure to correct the fine offset map obtained from a single shutter frame in imagers that utilize fast shutters.

An embodiment of the invention includes an infrared imager comprising at least one fast electrostatic shutter, wherein the shutter is used for video image correction. For embodiments, at least one electrostatic shutter is proximate a first lens and at least one electrostatic shutter is non-orthogonal to imager optical axis. In other embodiments, at least one electrostatic shutter is proximate a focal plane array and at least one electrostatic shutter comprises segments. In another, the imager comprises multiple electrostatic shutters. In yet others, the multiple electrostatic shutters comprise at least one shutter and the multiple electrostatic shutters comprise at least one aperture. In one embodiment, at least one electrostatic shutter comprises a thermal uniformity component. The thermal uniformity component is a metal bar in another embodiment.

Other embodiments include a method of manufacturing an electrostatic infrared shutter comprising providing an infrared transparent substrate; ensuring the substrate is conductive; covering the substrate with a thin insulating layer; depositing a glue stripe along one edge of conductive surface of the substrate; depositing a thin film stack on conductive surface of the substrate, whereby the glue stripe is covered; delineating a working area in the thin film stack; providing contacts to the conductive layer and to conductive layer of the film stack; heat-treating the shutter whereby it forms a roll; and treating the shutter to be non-reflective in the infrared. In an embodiment, the shutter film is disposed on a surface of an optical component of an imaging system, whereby shutter assembly size and weight is decreased. In yet another embodiment, the shutter film is disposed on a surface of an existing optical component of an imaging system, wherein absence of separate shutter substrate eliminates two optical interfaces along the optical path, reducing optical losses. For other embodiments, the shutter film is disposed on an imager window, wherein the image window is substrate of the shutter.

An embodiment is an offset compensation method employing a fast shutter in an infrared imager comprising extrapolating fine offset value; correcting temporal noise; and applying a running average whereby residual spatial patterns are reduced. Further embodiments include a correcting temporal noise step comprising maintaining a running average of an offset frame in an image processing unit and wherein the step of maintaining a running average comprises low-pass filtering of a fine offset map whereby artifacts caused by incomplete thermalization of bolometers are averaged out. In a method, the step of extrapolating a fine offset value comprises obtaining a scene image preceding shutter engagement; and obtaining an image of the shutter acquired immediately after its engagement, whereby pixels of the imager do not have sufficient time to reach steady-state temperature; and extrapolating imager response to a uniform thermal scene. For other methods, the infrared imager comprises bolometers and the bolometers' thermal time constant and power factor are common for all pixels and are obtained as scalars at calibration, and a product of the time constant of low-pass filtering and the time interval between shutter closings is less than the characteristic time over which the temperature of the infrared imager enclosure or imager lens changes by more than about approximately one degree Celsius.

The features and advantages described herein are not all-inclusive, and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

As disclosed herein, a shutter is defined as a movable cover or screen in the optical path of the imager. In embodiments, it can include diaphragms and apertures. Shutters are electro-mechanical devices comprising a conductive transparent (in the infrared) substrate, an insulating layer and a film attached to the substrate along one side. The film consists of a metal layer and a polymer layer prepared in such a way that under normal conditions the film is tightly rolled up (because of internal stress forces) and thus the aperture is open. When voltage is applied between the film and the substrate, the film unrolls (because of electrostatic attraction to the substrate) and blocks the aperture—the shutter is closed. Additionally, the surface of the film facing the infrared imaging sensor should be black and non-specular, so as to present a blackbody-like radiation source to the imaging sensor in the infrared wavelength band. For example, the film can be painted with catalac black paint available from TDMG, Inc of Montréal, Québec.

This form of shutter can be deployed on a time scale shorter than the frame period. This allows for periodic engagement with loss of only one or two sequential frames. It creates a "shutterless" experience for the user. Quiet operation makes it less distracting to the user and, in covert applications (gun sights, night vision goggles, etc.), protects the user from being detected. Low power consumption increases battery life. The flat package that is possible gives more flexibility in positioning the shutter within the imager. In some embodiments, the shutter film is manufactured on the inner or the outer surface of the imager window, using it as a substrate. In other embodiments, the shutter film may be manufactured on the surface of one of the existing optical components of the imaging system. In both cases, this results in further decrease in size and weight of the shutter assembly. Additionally, absence of a separate shutter substrate eliminates two optical interfaces along the optical path and therefore reduces optical losses in the system. Another advantage of the electrostatic shutter is that its temperature is more uniform than that of a mechanical shutter because most of the time it is rolled up, assisting thermal equilibrium.

The following figure descriptions disclose embodiments of shutter configurations. Subsequent paragraphs disclose infrared shutter manufacturing methods, shutter operation methods, and offset compensation methods.

Figure 1:
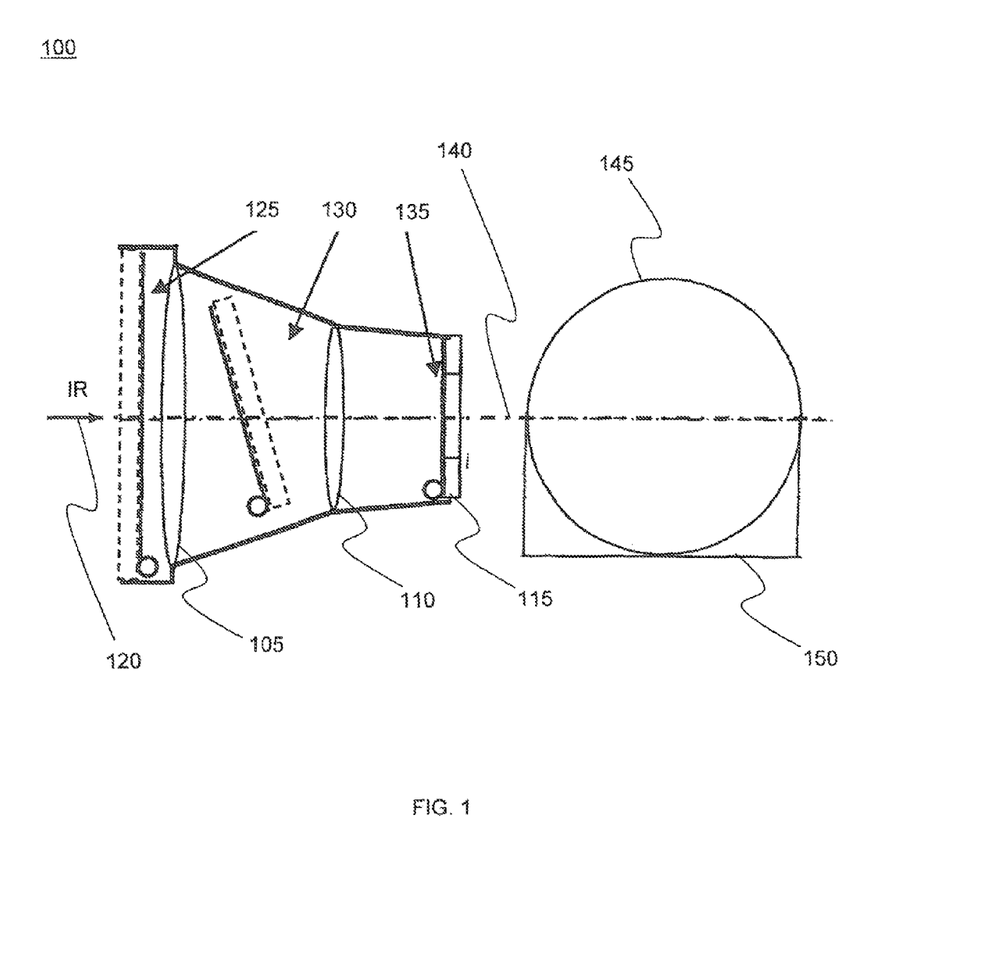
FIG. 1 is a simplified diagram of an imager configured in accordance with an embodiment of the invention.

FIG. 1 depicts a simplified diagram of an imager embodiment 100. The imager diagram shows a first lens 105, a second lens 110, and a focal plane array (imager module) 115. IR arrow 120 denotes the incoming infrared radiation (from the scene). Alternative locations of electrostatic shutters include a location 125 proximate first lens 105, a location 130 between first lens 105 and second lens 110, and a location 135 proximate focal plane array 115. Location 130 depicts a tilted shutter in which the shutter does not reflect the focal plane array (FPA) onto itself, in other embodiments, shutter at location 130 can be perpendicular to optical axis 140. View 145 shows a front perspective of the imager, from the direction of the IR radiation 120, and includes area 150 that accommodates a rolled-up shutter. When the metal/polymer film is manufactured on the inner or the outer surface of the optical window of the focal plane array, the window has an additional role of shutter substrate. This saves space, cost, and weight without introducing additional optical interfaces into the optical path. When the metal/polymer film is manufactured on one of the existing optical components, e.g. a lens with minimal curvature, the same advantages exist as when on the optical window of the focal plane array.

Figure 2:
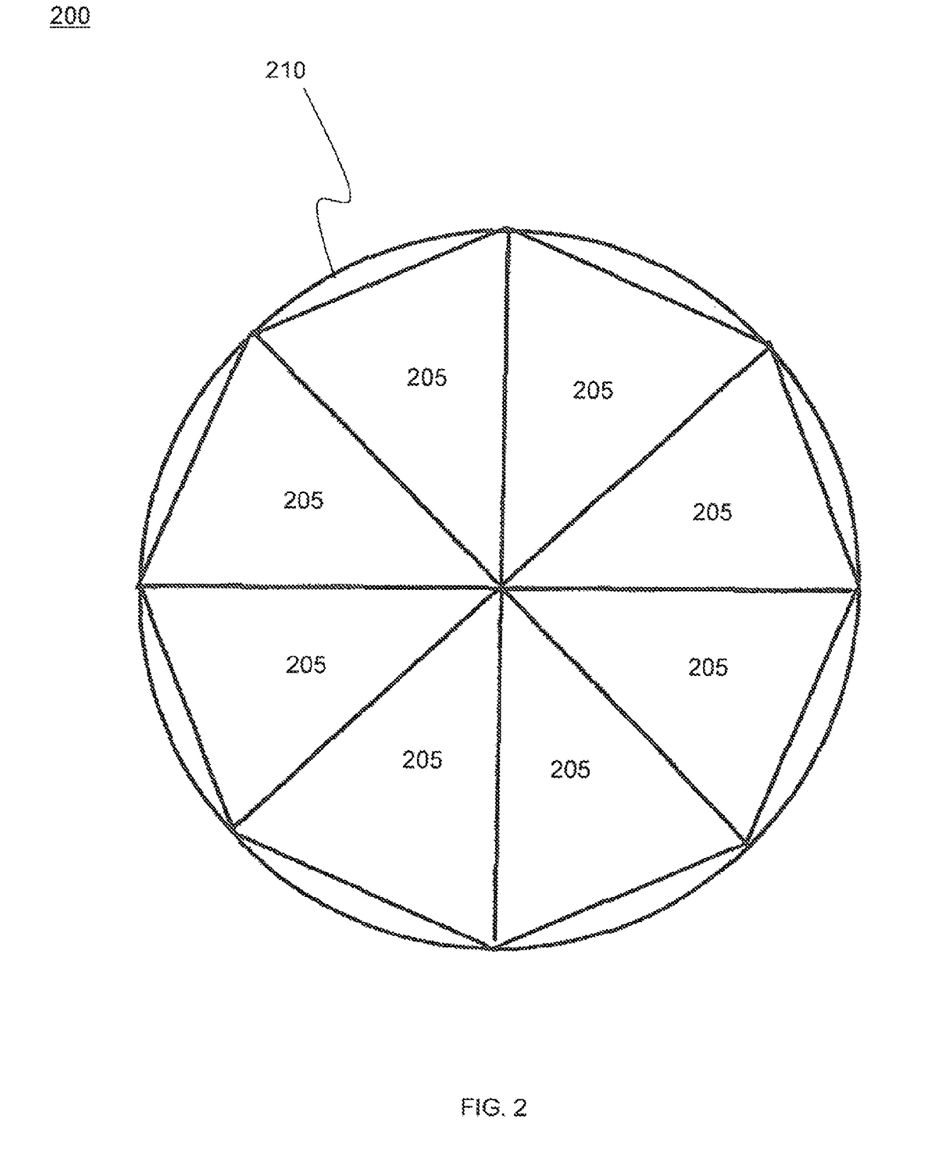
FIG. 2 is a simplified diagram of a segmented shutter configured in accordance with an embodiment of the invention.

FIG. 2 depicts a simplified diagram of a segmented shutter embodiment 200. The shutter is delineated into several segments 205, making it possible to manufacture and operate it on a curved substrate (e.g. a lens surface) saving space on edge 210 of the imager, in the area where the shutter rolls up. The individual segments (petals) deploy simultaneously. This saves space along the perimeter of the optical elements, the area that otherwise would be required to accommodate the roiled-up shutter. As mentioned, if the petals are narrow enough, such composite shutter may be manufactured on a curved surface of a lens, thus reducing size, weight, cost and the number of optical interfaces.

Figure 3:
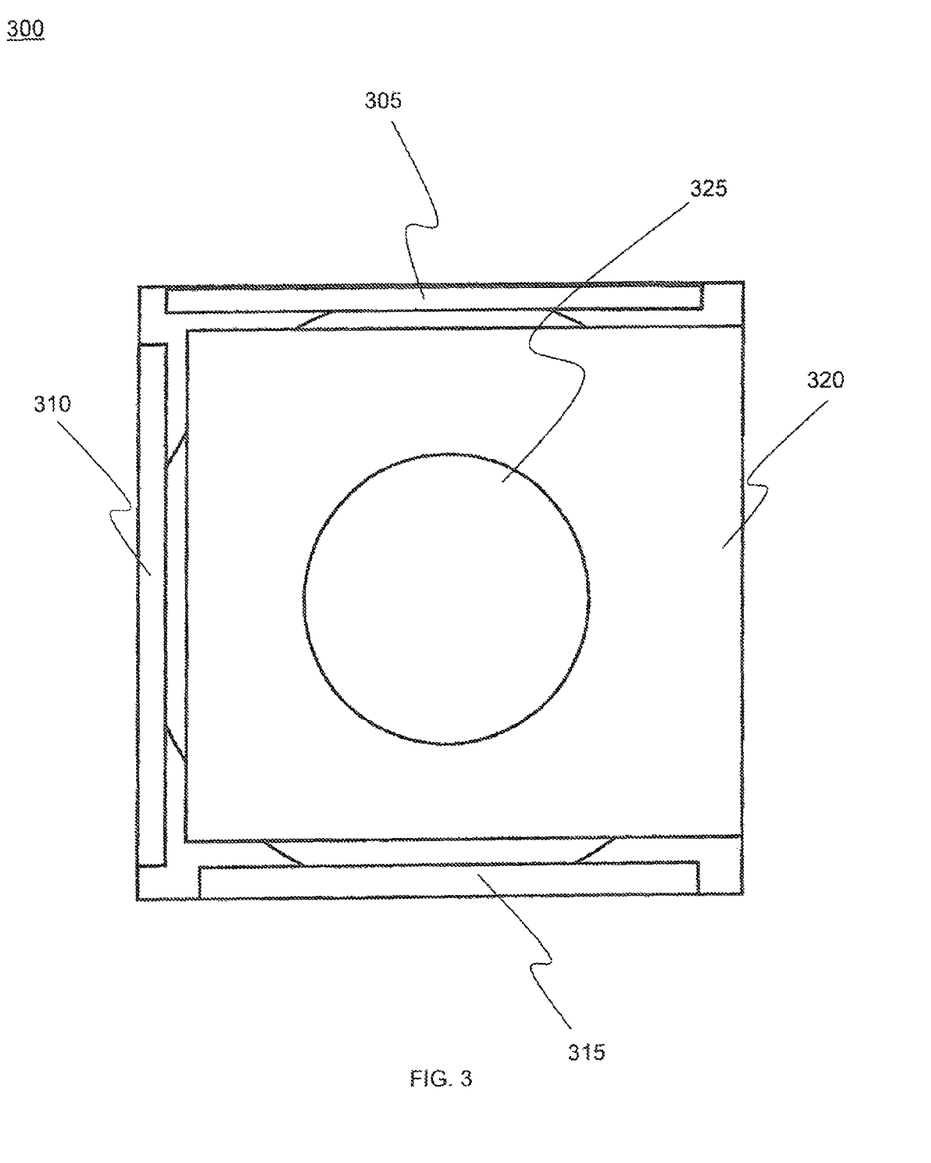
FIG. 3 is a simplified diagram of an assembly containing multiple shutters or apertures configured in accordance with an embodiment of the invention.

FIG. 3 depicts a simplified diagram of a front view of an assembly embodiment 300 containing multiple shutters or apertures. Three shutters 305, 310, and 315 are shown rolled up; one 320—forming a small aperture 325—is unrolled. Here, several shutters are manufactured on the same substrate and attached to it along its different edges. Only one of them is unrolled at any time. As depicted, some of these films may have openings in them and serve not as shutters but as apertures or beam stops and be selectively engaged depending on the operating conditions of the imager.

Figure 4:
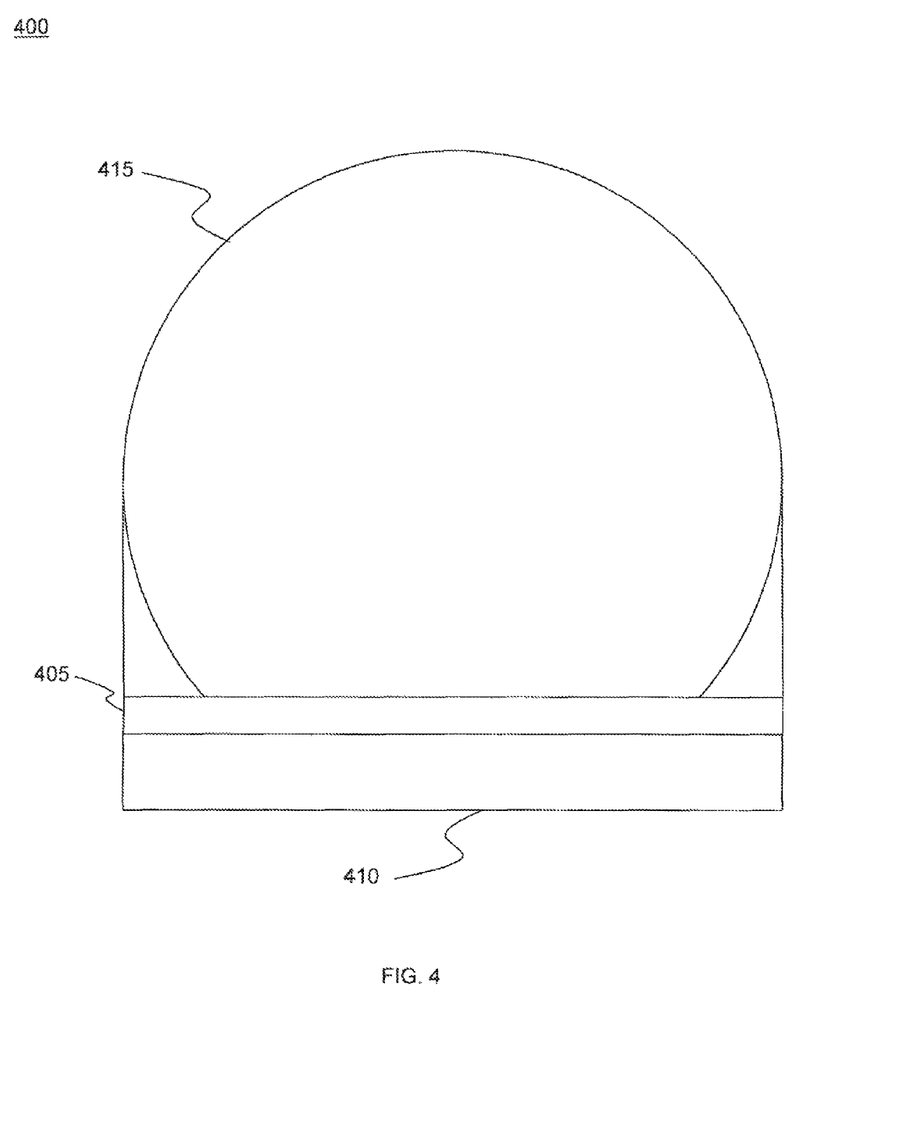
FIG. 4 is a simplified diagram of a shutter including a thermal uniformity component configured in accordance with an embodiment of the invention.

FIG. 4 depicts a simplified diagram of a shutter embodiment 400 including a thermal uniformity component. Rolled-up shutter 405 touching a metal bar 410 results in better thermal uniformity of the shutter. Outline 415 depicts a circular extent of a rolled-out shutter. Because the shutter contains a very thin metal layer, thermal conductivity along its roll-up axis (along the glue stripe) may be insufficient for a uniform temperature. In order to overcome this, a thermally conductive component such as a metal bar can be positioned along the edge of the optical system. Any thermally conductive component can be used in embodiments. When the shutter is in the rolled-up position (due to stress forces) it is pressed against the thermally conductive component. This component serves as a thermal shunt for the shutter. Since, during the imager operation, the shutter is rolled up most of the time, it will be in contact with the bar. As a result, shutter temperature will be uniform.

Figure 5:
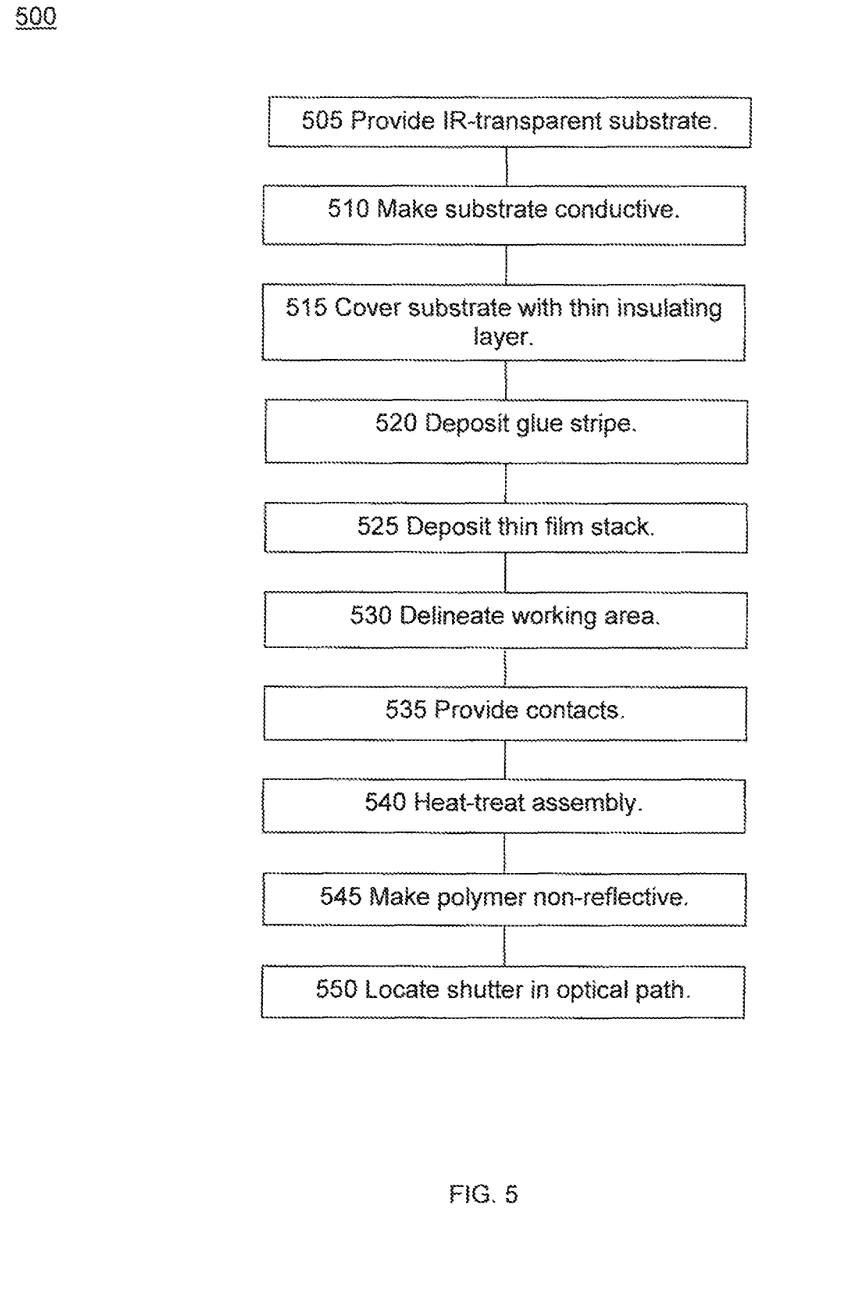
FIG. 5 is a flow chart of a manufacturing method for an electrostatic infrared shutter configured in accordance with an embodiment of the invention.

FIG. 5 is a flow chart of a manufacturing method 500 for an electrostatic infrared shutter. A substrate transparent in the infrared is provided 505 (e.g. germanium). It is made to be conductive 510 on at least at one surface (e.g. by diffusing impurities into it). In embodiments, it may be sufficiently conductive inherent in its original manufacture. The substrate is covered with a thin insulating layer 515 (e.g. germanium oxide or a polymer). A stripe of glue is deposited along one edge of the conductive surface of the substrate 520. A thin film stack of metal/polymer (e.g. aluminum/polyimide) is deposited 525 on the conductive surface of the substrate, so that it covers the glue stripe. A working area in the film stack is delineated using e.g. laser ablation, into the size and shape of the desired shutter 530. The glue stripe is located within the delineated area, parallel and in proximity to its edge. Contacts are provided 535 to the conductive layer on the substrate and to the conductive layer of the film stack.

The assembly is heat-treated 540, followed by a cooldown, which causes the polymer to cure and later to shrink dramatically. Since the metal layer does not shrink as much, stress builds up along the metal/polymer surface, and as a result, the metal/polymer stack rolls up tightly towards the edge of the working area that is attached to the substrate with glue. The polymer layer is made non-reflective (infrared) 545 with pigment such as catalac black paint available from TDMG, Inc of Montréal, Québec.

The shutter is positioned 550 in the optical path of the imager, so that when it is unrolled, the imager sees its blackened surface and when it is rolled up, the imager sees the outside scene.

Examples of positioning the shutter in the infrared imager are shown in FIG. 1. In operation, the shutter is rolled up (open) when no voltage is applied to the structure. When high voltage (on the order of 100V) is applied to the structure, the shutter unrolls due to the electrostatic attraction forces between the conductive layer of the substrate and the metal film—the shutter is closed. Because the device is essentially a capacitor, current consumption is minimal.

This shutter operation is used for image offset compensation. The shutter's image is acquired and later subtracted from the streaming video before further corrections are applied. Because the shutter has uniform temperature, this operation corrects for variations of pixel offsets when acquiring a uniform temperature scene and thus reduces spatial noise in the image caused by nonuniformities at the pixel level.

A product-level advantage of a fast infrared shutter is reduced system cost, including elimination of a button to activate the shutter. In addition, the user can be dedicated to viewing and analyzing the imagery and not distracted by needing to push a shutter button. This method provides a "shutterless" experience for the user because the image will be blocked for only one frame at a time. To give a "shutterless" experience, the shutter is typically activated for no more than 1-2 frames and the period between subsequent shutter activations is typically no less than ten to twenty seconds. While the shutter is closed, the user can be presented with the last acquired scene image (alternatively, the user can be shown a uniform image, depending on what approach is less noticeable to the user).

However, activating the shutter for such a short duration involves two issues: 1) temporal noise cannot be averaged out over 1-2 frames; and 2) scene nonuniformity. There is insufficient time for the imager to thermalize to the thermally uniform scene presented by the shutter. The time between the shutter closure and frame acquisition is not long enough compared to the thermal constant of bolometers, therefore the acquired shutter image will not be that of a uniform scene, but rather an attenuated (faded) image of the last scene.

The disclosed method corrects the fine offset map obtained from a single shutter frame in imagers that utilize fast shutters. It is based on extrapolating the imager response to a uniform thermal scene using 1) the real scene image preceding the shutter engagement and 2) the image of the shutter acquired immediately after its engagement (so that the pixels of the imager have started to thermalize to the uniform scene presented by the shutter, but may not have finished the thermalization process).

In embodiments, temporal noise is addressed by keeping track of the running average of the fine offset map $FO_{aver}$, and adding a fraction of the newly acquired shutter image $FO_{last}$ to the average:

$$FO_{aver_i} = (N-1)/N * FO_{aver_{i-1}} + 1/N * FO_{last}, \quad (1)$$

$FO_{aver_{i-1}}$ is the fine offset map value after $(i-1)^{th}$ iteration of the algorithm.

$FO_{aver_i}$ is the fine offset map value after $i^{th}$ iteration of the algorithm.

N*T defines the time constant of the low-pass filtering, where N is configurable parameter and T is the time interval between shutter closings.

$FO_{last}$ is the last, newly acquired, fine offset map, after thermal extrapolation.

T is the time interval between shutter closings.

The product N*T should be less than the characteristic time over which the thermal environment of the device noticeably changes. For example, if the characteristic environment time is 5 mill and T=15 sec, N can be set to 16. In embodiments, a running average of the offset frame is maintained in the image processing unit of the imager to achieve temporal noise compensation.

Figure 6:
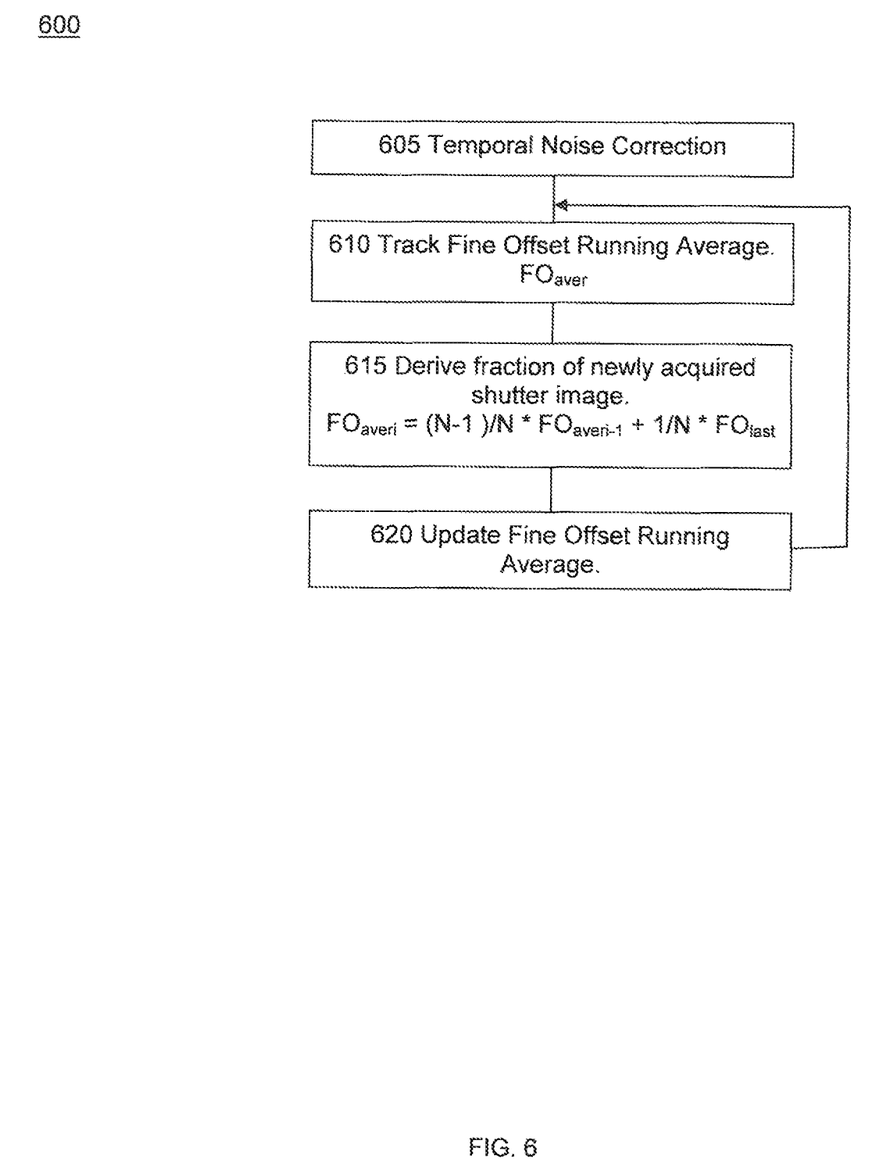
FIG. 6 is flow chart depicting an offset compensation method for temporal noise configured in accordance with an embodiment of the invention.

FIG. 6 depicts these steps as a flow chart 600. Temporal noise correction 605 is accomplished by tracking Fine Offset running average 610. A fraction of a newly acquired shutter image 615 is used to Update 620 the running average tracked at 610. The resultant fine offset map addresses temporal noise components from employing fast shutters.

In embodiments, scene nonuniformity is addressed by two approaches: scene-based averaging and thermal extrapolation.

Scene-based averaging essentially assumes that the scene changes significantly between sequential offset corrections. Therefore, applying the same principle as low-pass filtering of the fine offset map as described above (equation 1) will average out artifacts caused by incomplete thermalization of bolometers. The general logic is as follows: (a) perform thermal extrapolation on each acquired shutter imago: (b) apply low-pass filtering. The low-pass filtering has benefits: (a) it attenuates temporal noise; (b) it further attenuates residual nonuniformities after thermal extrapolation. Note that scene-based averaging is not effective when the imager is stationary. That is, when the imager is continuously looking at the same scene. Note that $FO_{last}$ (the last, newly acquired, fine offset map, after thermal extrapolation) is already the result of applying thermal extrapolation to the acquired shutter image. Using additional scone-based logic (as in the true shutterless approach) can further refine this compensation.

The thermal extrapolation approach takes advantage of the effect that after the shutter closes, bolometer resistances will approximately asymptotically (e.g. exponentially) go towards values corresponding to exposure to a uniform scene.

For each pixel, the temporal dependence of the acquired signal may be represented with the following equation:

$$C(t) - C_{sh-inf} = A * \Delta T * \exp(-(t/\tau)^n) \quad (2)$$

t is time from the closure of the shutter.

$C_{sh-inf}$ is the pixel value that would be acquired after the shutter were closed for a duration much longer than the thermal time constant of the bolometer.

$\Delta T$ is the difference between the scene temperature and the shutter temperature.

A is a multiplicative factor.

$\tau$ (tau) is the thermal time constant of the bolometer.

n is the power factor.

The time constant of the imager pixels can, for example, be obtained during factory calibration of the imager.

Assuming that $\tau = \text{const}(\Delta T)$ and that $A = \text{const}(t)$, we can derive that $$(C_{scene} - C_{sh-1})/(C_{scene} - C_{sh-inf}) = 1 - \exp(-(t_1/\tau)^n) \quad (3)$$

$C_{scene}$ represents the last pixel value with the shutter open.

$C_{sh-1}$ is the first pixel value acquired with the shutter closed.

$C_{sh-inf}$ is the pixel value that would be acquired after the shutter were closed for the duration much longer than the thermal time constant of the bolometer.

$t_1$ is the reciprocal of the frame rate.

Knowing $\tau$ and n from calibration; knowing $C_{scene}$ and $C_{sh-1}$ from measurements; and knowing that $t_1$ is the reciprocal of the frame rate, we can obtain $C_{sh-inf}$, which is the fine offset value, Both $\tau$ and n are most likely common for all pixels and therefore can be obtained as scalars rather than maps at calibration time (typically, at least n should be the same for all pixels).

Figure 7:
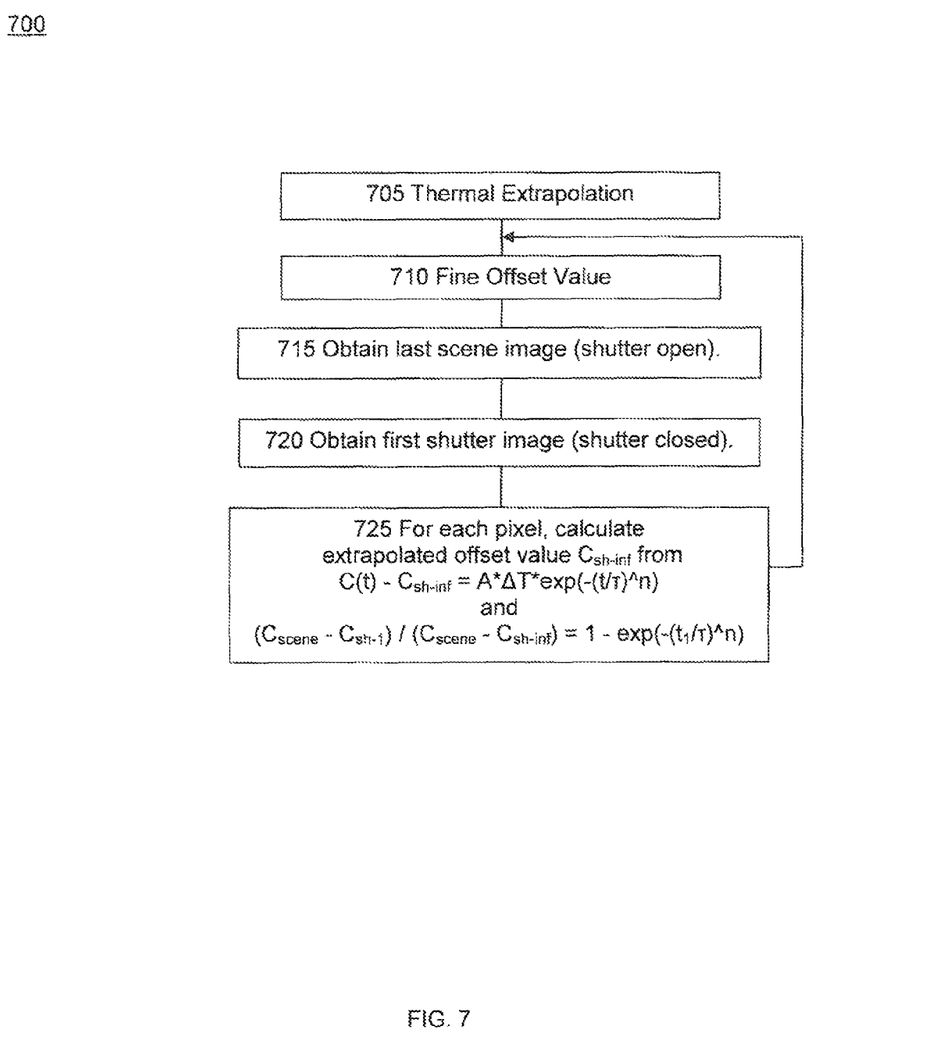
FIG. 7 is flow chart depicting an offset compensation method for scene nonuniformity configured in accordance with an embodiment of the invention.

FIG. 7 depicts thermal extrapolation-based fine offset correction for scene nonuniformity in flow chart 700. Thermal extrapolation 705 is accomplished by extrapolating a value for fine offset $C_{sh-inf}$ 710. With the shutter open, the last scene image is obtained 715. After closing the shutter, the first shutter image obtained 720. Based on equations 2 and 3 above, extrapolated $C_{sh-inf}$, the fine offset value, is obtained 725. Specifically, for each pixel, calculate extrapolated offset value $C_{sh-inf}$ from $C(t)-C_{sh-inf}=A*\Delta T*\exp(-(t/\tau t)^n)$ and $(C_{scene}-C_{sh-1})/(C_{scene}-C_{sh-inf})=1-\exp(-(t_1/\tau)^n)$. The resultant extrapolation compensates for the briefness of the shutter time compared to the bolometer thermal constant.

The residual error after extrapolation-based fine offset correction will be further reduced by low-pass filtering as described in equation 1. in embodiments, $\tau$ and n are obtained during calibration. They are obtained by acquiring a sequence of images that cover a scene and the process of closing the mechanical shutter followed by extracting the thermal time constant $\tau$ and the factor n using regression techniques. If a map of any of these parameters turns out to be sufficiently uniform this parameter can be stored in the imager memory as a scalar value rather than a map.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of manufacturing an electrostatic infrared shutter comprising:
   providing an infrared transparent substrate;
   ensuring said substrate is conductive;
   covering said substrate with a thin insulating layer;
   depositing a glue stripe along one edge of conductive surface of said substrate;
   depositing a thin film stack on a conductive surface of said substrate, whereby said glue stripe is covered;
   delineating a working area in said thin film stack;
   said thin film stack comprising said shutter;
   providing contacts to said conductive surface of said substrate and to a conductive layer of said film stack;
   heat-treating said shutter whereby it forms a roll; and
   treating said shutter to be non-reflective in infrared wavelengths.

2. The manufacturing method of claim 1, comprising a thermal uniformity component positioned along and edge of an optical system comprising said shutter, said shutter being pressed against said thermal uniformity component when in rolled-up position, supporting thermal equilibrium of said shutter.

3. The manufacturing method of claim 2, wherein said thermal uniformity component comprises a metal bar.

4. The manufacturing method of claim 1, wherein said thin film stack is disposed on a surface of an optical component of an imaging system, whereby shutter assembly size and weight is decreased.

5. The manufacturing method of claim 1, wherein said thin film stack is disposed on a surface of an existing optical component of an imaging system, wherein absence of separate shutter substrate eliminates two optical interfaces along the optical path, reducing optical losses.

6. The manufacturing method of claim 1, wherein said thin film stack is disposed on an imager window, wherein said image window is said substrate of said shutter.

7. The manufacturing method of claim 1, wherein said this film stack is delineated into a plurality of sectors by radical lines forming petal segments.

8. The manufacturing method of claim 1, wherein said thin film stack is manufacturing on a curved surface of a lens.

9. The manufacturing method of claim 1, wherein said thin film stack is delineated into a plurality of sectors by radial lines forming petal segments, and all of said of segments deploy simultaneously.

10. The manufacturing method of claim 1, wherein said shutter comprises an aperture.

11. The manufacturing method of claim 1, comprising placing multiple shutters in a single optical path.

12. The manufacturing method of claim 1, wherein multiple shutters are attached along different edges of said substrate.

13. The manufacturing method of claim 1, wherein said shutter comprises a beam stop.

14. The manufacturing method of claim 1, wherein said substrate comprises germanium.

15. The manufacturing method of claim 1, wherein said substrate is made conductive by diffusing impurities into said substrate.

16. The manufacturing method of claim 1, wherein said thin insulating layer covering said substrate comprises germanium oxide.

17. The manufacturing method of claim 1, wherein said shutter closes by unfurling with application of about 100 volts.

18. The manufacturing method of claim 1, wherein said thin film stack comprises aluminum/polyimide.

19. A method of manufacturing an electrostatic infrared video camera shutter comprising:
   providing an infrared transparent substrate;
   ensuring said substrate is conductive on at least one surface;
   substantially covering said substrate with a thin insulating layer;
   depositing a glue stripe along only one edge of a conductive surface of said substrate;
   depositing a thin film stack on said thin insulating layer on said conductive surface of said substrate, whereby said glue stripe is covered;
   delineating a working area in said thin film stack;
   said thin film stack comprising said shutter;
   providing contacts to said conductive surface of said substrate and to a conductive layer of said film stack;
   heat-treating said shutter whereby it forms a roll; and
   treating said shutter to be a blackbody surface, non-reflective in infrared wavelengths.

20. A method of manufacturing an electrostatic infrared shutter comprising:
- providing an infrared transparent substrate;
- ensuring said substrate is conductive;
- covering said substrate with a thin insulating layer;
- depositing a glue stripe along only one edge of a conductive surface of said substrate;
- depositing a thin film stack on said substrate, whereby said glue stripe is covered;
- delineating a working area in said thin film stack;
- said thin film stack comprising said shutter;
- providing contacts to said conductive surface of said substrate and to a conductive layer of said film stack;
- heat-treating said shutter whereby it forms a roll; and treating said shutter to be non-reflective in infrared wavelengths;

said shutter providing offset compensation through an image of a single shutter frame of said shutter to extrapolate a fine offset value, correct temporal noise and apply a running average whereby residual spatial patterns are reduced.

* * * * *